United States Patent [19]
Filbrun

[11] Patent Number: 6,135,485
[45] Date of Patent: Oct. 24, 2000

[54] PIVOTAL TOWBAR TORSIONAL SPRING

[75] Inventor: Darryl W. Filbrun, Covington, Ohio

[73] Assignee: Illinois Tool Works Inc., Glenview, Ill.

[21] Appl. No.: 09/189,906

[22] Filed: Nov. 11, 1998

[51] Int. Cl.[7] .................................. B62D 1/00; B62D 1/34
[52] U.S. Cl. ............................................................ 280/493
[58] Field of Search .................................. 280/493, 498, 280/489, 491.1, 491.3, 494; 267/179, 273, 275, 285, 182; 43/61, 81, 83

[56] References Cited

U.S. PATENT DOCUMENTS

| | | |
|---|---|---|
| 2,452,710 | 11/1948 | Allen . |
| 2,590,962 | 4/1952 | Gurton et al. . |
| 2,595,474 | 5/1952 | Marivn . |
| 3,331,618 | 7/1967 | Head et al. . |
| 3,365,003 | 1/1968 | Woodworth . |
| 3,556,561 | 1/1971 | Gingue . |
| 3,593,890 | 7/1971 | MacKinnon ............................ 222/176 |
| 4,078,822 | 3/1978 | Shelquist et al. ...................... 280/489 |
| 4,471,973 | 9/1984 | Beckmann, Sr. ........................ 280/483 |
| 4,509,769 | 4/1985 | Weber .................................. 280/491 R |
| 4,961,743 | 10/1990 | Kees, Jr. et al. ........................ 606/158 |
| 5,029,940 | 7/1991 | Golynsky et al. ...................... 297/301 |
| 5,240,273 | 8/1993 | Stead et al. ............................ 280/489 |
| 5,337,512 | 8/1994 | Krenzler .................................... 43/82 |
| 5,950,354 | 9/1999 | Carnwath .................................. 43/81 |

*Primary Examiner*—Brian L. Johnson
*Assistant Examiner*—Tony Winner
*Attorney, Agent, or Firm*—Mark W. Croll; John P. O'Brien; Donald J. Breh

[57] ABSTRACT

A pivotal towbar support having first and second torsional spring member each having a coil portion with a first end portion and a second end portion. The coil portions of the first and second torsional spring members are disposed along a common axis and arranged in spaced apart relation. A first transverse member couples the first end portions of the first and second torsional spring members, and a second transverse member couples the second end portions of the first and second torsional spring members. The first and second coil portions are disposable about the pivot, whereby the first transverse member is engageable with the pivotal member, and the second transverse member is engageable with the support member to support the pivotal member over at least a portion of its range of pivotal motion.

18 Claims, 2 Drawing Sheets

PIVOTAL TOWBAR TORSIONAL SPRING

BACKGROUND OF THE INVENTION

The invention relates generally to pivotal member support systems, and more particularly to a pivotal towbar support useable for supporting pivotal towbars and combinations thereof.

It is known generally to draw trailers with a towbar. In the aviation industry, for example, trailered ground power units are frequently coupled to a draw vehicle by a towbar. It is also known in this and other applications to pivotally couple the towbar to a support member on the trailer to permit positioning the towbar between raised and lowered positions, whereby the towbar is lowered to a generally horizontal position for coupling to the draw vehicle, and raised to a generally vertical position to eliminate any obstruction posed thereby and to facilitate stowage thereof when not coupled to the vehicle.

Known prior art pivotal towbars however have the disadvantage that, when lowered, the towbar tends to pivot downwardly until it strikes ground level, provided there are no obstructions therebetween. It is generally undesirable for the towbar to contact the ground since the towbar may become damaged, particularly the end portion thereof that hitches to the draw vehicle, and it will prevent injury to the operator's foot if the towbar is dropped. Also, the towbar must be raised upwardly from the ground to hitch the towbar to the draw vehicle. Raising the towbar and bearing its weight during alignment with the vehicle hitch is inconvenient, and in some applications may require substantial physical exertion.

The present invention is drawn toward advancements in the art of pivotal member support systems, and more particularly to pivotal towbar supports.

It is thus an object of the invention to provide novel pivotal member supports, including pivotal towbar supports, and combinations thereof that overcome problems in the art.

It is another object of the invention to provide novel pivotal member supports, including pivotal towbar supports, and combinations thereof that are economical, and that are installable to support pivotal members without modification to the pivotal member or at least with minimal modification thereto, and without substantial disassembly thereof.

It is also an object of the invention to provide novel pivotal member supports, including pivotal towbar supports, and combinations thereof that support the pivotal member, and at least in towbar applications that prevent the towbar from contacting the ground when it is lowered from a raised position to a lowered position.

It is a more particular object of the invention to provide novel pivotal member supports, for example pivotal towbar supports, useable for supporting pivotal members and combinations thereof comprising generally first and second torsional spring members each having a coil portion with a first end portion and a second end portion. The coil portions of the first and second torsional spring members are disposed along a common axis and arranged in spaced apart relation. A first transverse member couples the first end portions of the first and second torsional spring members, and the first and second coil portions are disposable about the pivot, whereby the first transverse member is engageable with the pivotal member, and the second end portions of the first and second torsional spring members are engageable with the support member to support the pivotal member over at least a portion of its pivotal range of motion.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTION

Figure 1:
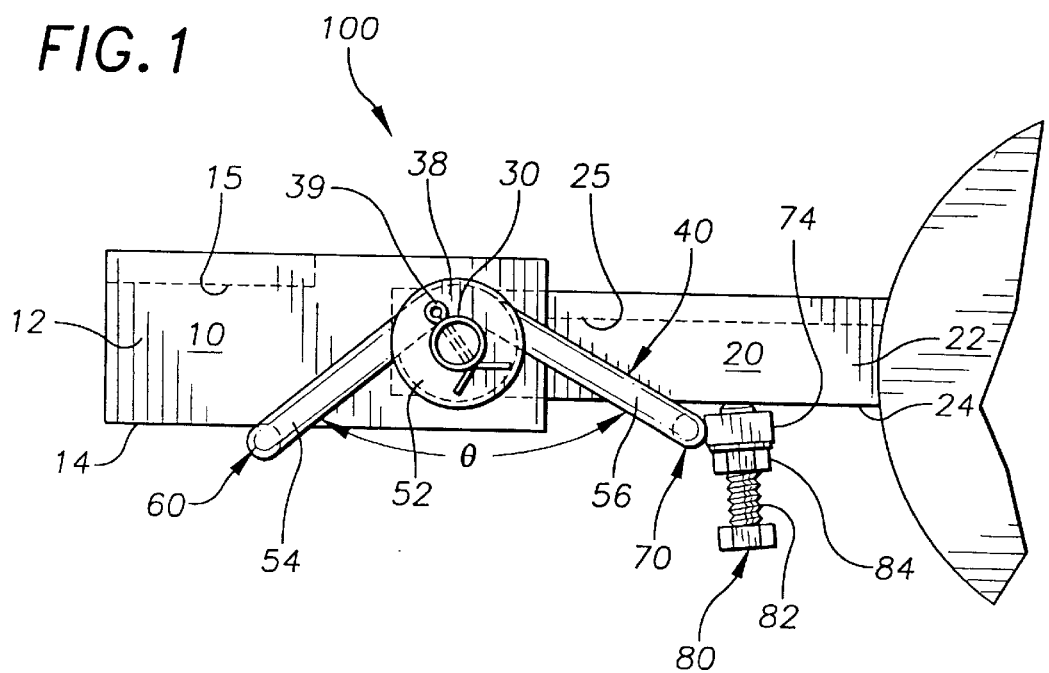
FIG. 1 is a partial side view of a pivotal towbar support system supporting a towbar in a lowered position.

FIG. 1 illustrates a pivotal member support system 100 comprising generally a pivotal member 10 pivotally coupled to a support member 20 by a pivot 30, whereby the pivotal member 10 is supported over at least a portion of its pivotal range of motion. In the exemplary embodiment of FIGS. 1 and 2, the pivotal member 10 is a towbar pivotal between raised and lowered positions, and the support member 20 is a towbar support member, whereby according to the present invention the towbar is supported in the lowered position, preferably above ground level as is desirable in some applications, for example trailered ground power units in the aviation industry.

Figure 4:
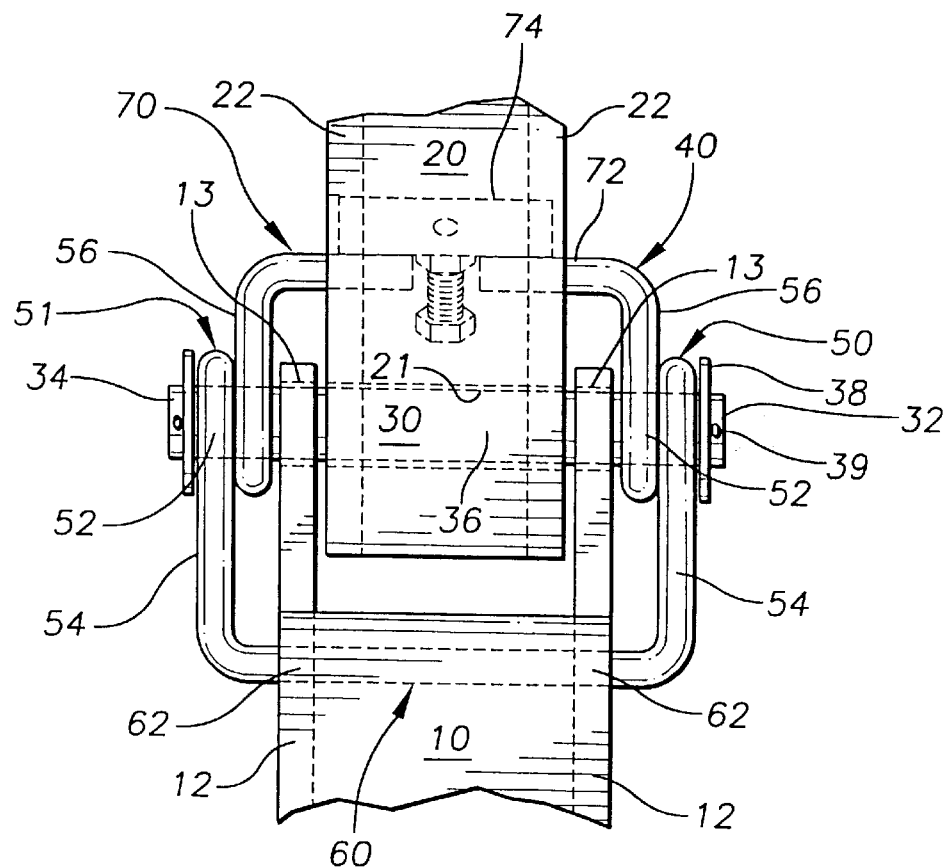
FIG. 4 is a partial top plan view of a pivotal towbar support system.

In FIG. 4, the support member 20 is a generally solid body member having an opening 21 with the pivot 30 disposed therethrough, and the pivotal member 10 includes side arms 12 extending along corresponding outer sides of the support member 20 with corresponding openings 13 therethrough for accommodating the pivot 30. In other embodiments, the support member 20 may also include side arms 22, illustrated in phantom lines in FIG. 4, rather than a solid body member, through which the pivot 30 is disposed, wherein the arms 22 of the support member may be located on the inner or outer side of the arms 12 of the pivotal member 10. More generally, the pivotal member 10 may be pivotally coupled to the support member 20 by any means so long as the one or more portions of the pivot are available to carry a pivotal member support, as discussed more fully below.

The pivot 30 may be freely rotatable in the openings through either or both the pivotal member 10 and the support member 20, or the pivot 30 may be rigidly coupled to one of the pivotal member 10 or the support member 20. The pivot 30 may be a pin or bolt or other means extending fully through the pivotal member 10 and the support member 20. The pivot 30 may alternatively comprise two discrete pivot portions, for example two bolts, disposed through openings on corresponding opposing sides of the pivotal and support members 10 and 20.

Figure 2:
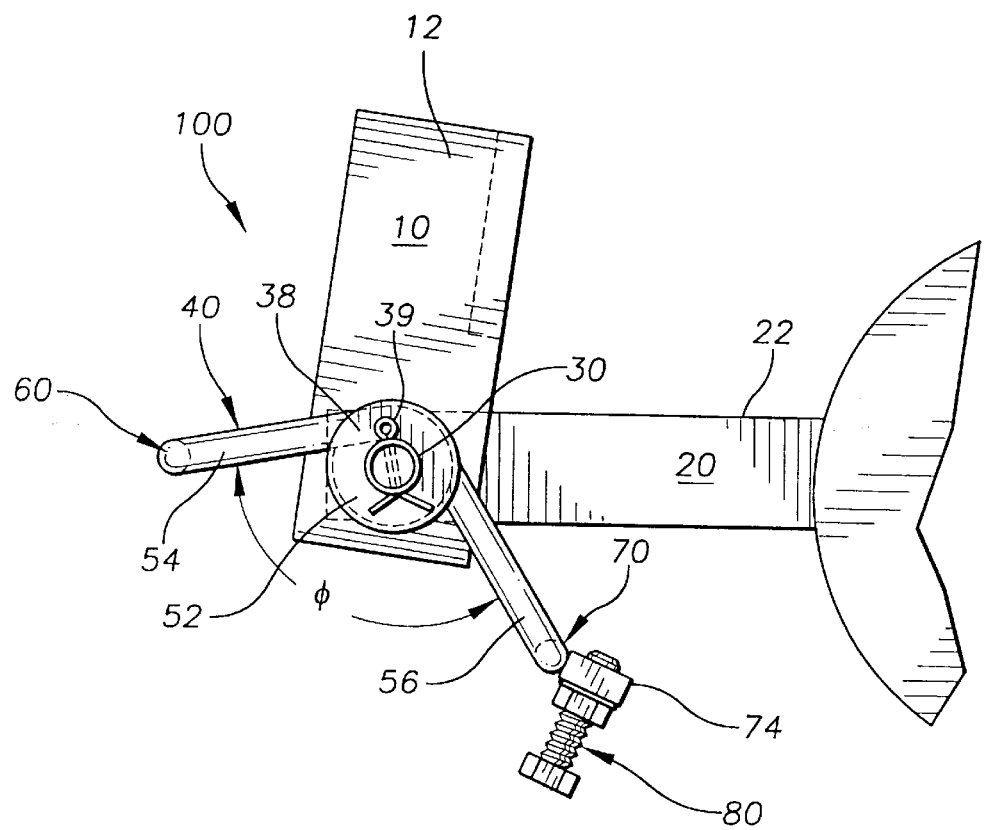
FIG. 2 is a partial side view of a pivotal towbar support system with the towbar in an upright position.
Figure 3:
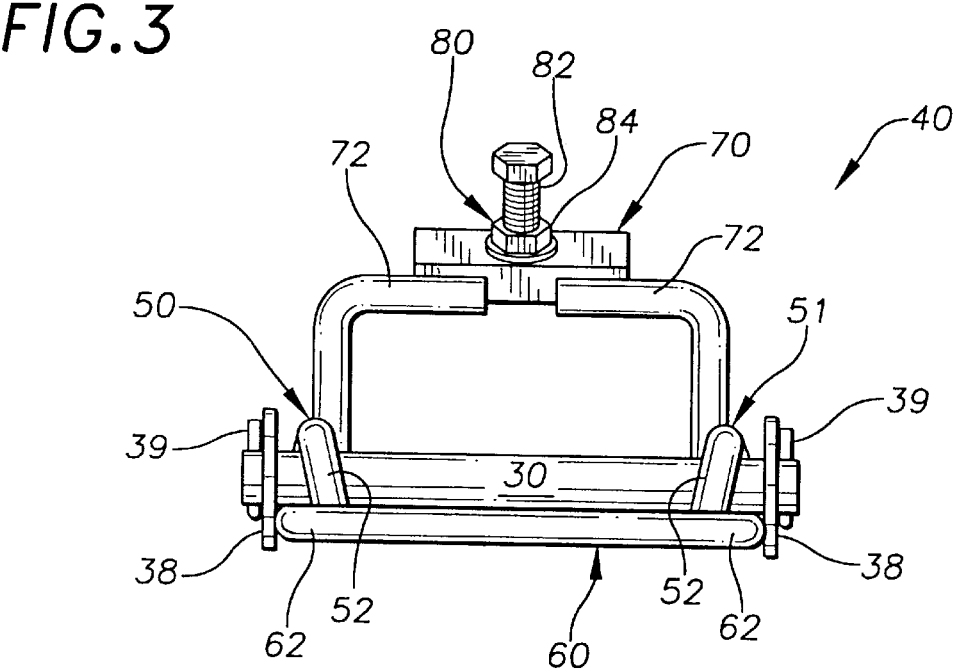
FIG. 3 is an end view of a pivotal member support according to an exemplary embodiment of the invention.

FIGS. 1–4 illustrate a pivotal member support 40 useable for supporting the pivotal member 10 over at least a portion of its pivotal range of motion. FIGS. 3 and 4 illustrate the pivotal member support 40 comprising generally first and second torsional spring members 50 and 51 having corresponding first and second coil portions 52. One of the second coil portions 52 is also illustrated, in phantom, in the side views of FIGS. 1 and 2. The first and second coil portions 52 each have preferably at least one 360 degree coil portion as illustrated in FIGS. 3 and 4, although other embodiments may include multiple coil portions. FIGS. 3 and 4 also illustrate the first and second coil portions 52 of the first and second torsional spring members 50 and 51 disposed along a common axis and arranged in generally parallel spaced apart relation.

The first and second coil portions 52 of the first and second torsional spring members 50 and 51 are generally disposable about the pivot 30, and more particularly one or more portions of the pivot 30 carry the first and second torsional spring members 50 and 51. In the exemplary embodiment of FIG. 4, the pivot 30 includes a first pivot portion 32 extending from a first side of the support member 10 and the pivotal member 20, and a second pivot portion 34 extending from a second opposing side of the support member 10 and the pivotal member 20. The first coil portion 52 of the first torsional spring member 50 is disposed about the first pivot portion 32, and the second coil portion 52 of the second torsional spring member 51 is disposed about the second pivot portion 34, whereby the first and second torsional spring members 50 and 51 are located on outer sides of the pivotal and support members 10 and 20.

FIGS. 1, 2 and 4 illustrate washers 38 and corresponding retention pins 39, for example cotter pins, retaining the pivotal support member 40 on the pivot 30, and more particularly retaining the first and second torsional spring members 50 and 51 on the first and second pivot portions 32 and 34. In alternative embodiments, other means may be suitable for this purpose, for example locking nuts disposed about opposing threaded end portions of the pivot 30.

In embodiments where the support member 20 includes side arms 22, the first and second coil portions 52 of the first and second torsional spring members 50 and 51 may be disposed about an intermediate portion 36 of the pivot 30 located between the side arms 22. And in embodiments where side arms 22 of the support member 20 are located on outer sides of the pivotal member 10, the first and second torsional spring members 50 and 51 may be disposed about the intermediate portion 36 of the pivot 30 located between the side arms 12 of the pivotal member 10. In either of these alternative configurations, the first and second torsional spring members 50 and 51 are disposed about the intermediate portion 36 of the pivot 30 located between the side arms of the pivotal and support members 10 and 20, thereby substantially concealing and protecting the first and second torsional spring members 50 and 51 from the environment.

FIG. 4 illustrates each of the first and second torsional spring members 50 and 51 having a corresponding first end portion 54 and a corresponding second end portion 56. The first and second end portions 54 and 56 of one of the torsional spring members is also illustrated in the side views of FIGS. 1 and 2, wherein the first end portions 54 are generally opposing the corresponding second end portions 56. More generally, however, there may be any angle between the first and second end portions 54 and 56. The first end portions 54 of the first and second torsional spring members 50 and 51 are disposed preferably in a first common plane, and the second end portions 56 of the first and second torsional spring members are disposed preferably in a second common plane, as illustrated best in the side views of FIGS. 1 and 2.

The first end portions 54 of the first and second torsional spring members 50 and 51 are engageable with either the pivotal member 10 or the support member 20, and the second end portions 56 of the first and second torsional spring members 50 and 51 are engageable with the other of the support member 20 or the pivotal member 10 to support the pivotal member 10 at least through a portion of its pivotal range of motion. In the exemplary embodiment, the first end portions 54 are engageable with the pivotal member 10, and the second end portions 56 are engageable with the support member 20 for this purpose.

FIGS. 3 and 4 illustrate a first transverse member 60 coupling the first end portion 54 of the first torsional spring member 50 to the first end portion 54 of the second torsional spring member 51, and a second transverse member 70 coupling the second end portion 56 of the first torsional spring member 50 to the second end portion 56 of the second torsional spring member 51. The first and second transverse members 60 and 70 are arranged generally parallel to the common axis of the first and second torsional spring members 50 and 51. Thus the first end portions 54 of the first and second torsional spring members 50 and 51 are engageable with the pivotal member 10 by the first transverse member 60, and the second end portions 56 of the first and second torsional spring members 50 and 51 are engageable with the support member 20 by the second transverse member 70.

In operation, the first transverse member 60 is generally engageable with a lower side 14 of the pivotal member 10, and the second transverse member 70 is generally engageable with a lower side 24 of the support member 20, over at least a portion of the pivotal range of the pivotal member 10, whereby the first and second torsional spring members 50 and 51 are resiliently flexible to support the pivotal member 10 over at least a portion of the pivotal range thereof relative to the support member 20. In other embodiments, the first and second transverse members 60 and 70 are engaged with the corresponding pivotal and support members 10 and 20 over the full range of pivotal motion of the pivotal member 10, for example to bias the pivotal member 10 in a generally upright position relative to the support member 20.

The first and second torsional spring members 50 and 51 are preferably disposed about the pivot 30 so that the corresponding first and second coil portions 52 are coiled increasingly, or tightened, about the pivot 30 when flexed, and more particularly when subject to a load that supports the pivotal member 10. In other embodiments, however, the first and second torsional spring members 50 and 51 are may be disposed about the pivot 30 so that the corresponding first and second coil portions 52 are coiled decreasingly, or loosened, about the pivot 30 when flexed.

In the exemplary embodiment, the first transverse member 60 is generally engageable with the lower side 14 of the pivotal member 10, and the second transverse member 70 is generally engageable with the lower side 24 of the support member 20, when the pivotal member 10 is lowered from a generally upright position to a lower, generally horizontal position. FIG. 2 illustrates the pivotal member 10 in the generally upright stowage position, whereby the first and second transverse portions 60 and 70 are not engaged with the pivotal and support members 10 and 20. However, as the pivotal member 10 is lowered from the upright position toward a relatively level or generally horizontal position, the first and second transverse portions 60 and 70 engage the pivotal and support members 10 and 20 and flex the first and second coil portions 52 until the first and second torsional spring members 50 and 51 ultimately support the pivotal member 10 in the generally horizontal position illustrated in FIG. 1, whereby in the exemplary towbar application the pivotal member support 40 preferably prevents the pivotal member 10 from contacting the ground.

In the exemplary embodiment of FIG. 2, an angle φ between the first and second end portions 54 and 56, and thus the corresponding first and second common planes, is less than 180 degrees when the first and second torsional spring members are not supporting the pivotal member 10. FIG. 1 illustrates the angle θ between the first and second end portions 54 and 56 less than the angle φ of FIG. 2 when the first and second torsional spring members are flexed under the supporting load of the pivotal member 10.

In the alternative embodiment where the first and second torsional spring members 50 and 51 are disposed about an intermediate portion 36 of the pivot 30, as discussed above, the first and second transverse members 60 and 70 are engageable with undersides 15 and 25 of the pivotal and support members 10 and 20, respectively. With this configuration however the first and second transverse members 60 and 70 are not required, since the first and second end portions 54 and 56 are engageable directly with undersides 15 and 25 of the pivotal and support members 10 and 20. According to these alternative configurations, the angle between the first and second end portions 54 and 56 may be as much as 180 degrees when the first and second torsional spring members 50 and 51 are not supporting the pivotal member 10.

In other alternative embodiments, the first and second end portions 54 and 56 of the first and second torsional spring members 50 and 51 are engagable with the pivotal and support members 10 and 20 without the first and second transverse members 60 and 70. In one embodiment, one or both of the first and second end portions 54 and 56 are fastened directly to the side portions 12 and 22 of the pivotal and support members 10 and 20, for example by welding. In another embodiment, illustrated in phantom in FIG. 4, the first and second end portions 54 and 56 each have corresponding first and second transverse portions 62 and 72 directed generally inwardly and engaged with the pivotal and support members 10 and 20 by insertion thereof into openings on corresponding opposing sides thereof, or engageable with the undersides 14 and 24 thereof. Thus the first and second end portions 54 and 56 of the first and second torsional spring members 50 and 51 are generally engageable with the pivotal and support members 10 and 20 through many means, including any combination and equivalents of the specific exemplary embodiments disclosed herein.

In another preferred embodiment, the pivotal member support 40 further comprises an adjustment member 80 protruding through the second transverse member 70, whereby the adjustment member 80 is adjustably engageable with the support member 20, or alternatively with the pivotal member 10, to adjustably bias the first and second torsional spring members 50 and 51. In the exemplary embodiment, the adjustment member 80 comprises a threaded shaft portion 82 threadably disposed through the second transverse member 70, and more particularly through a threaded plate portion 74 thereof. A nut 84 may be disposed about the threaded shaft 82 and tightened against the plate portion 74 to prevent rotation of the threaded shaft 82 after adjustment. The plate portion 74 is preferably coupled to the two second transverse portions 72 of the second transverse member 70, for example by welding, whereby the portions 72 and the plate portion 74 comprise the second transverse portion 70. Alternatively, the plate portion 74 may be coupled directly to the second portions 56 of the first and second torsional spring members 50 and 51, without the portions 72.

FIG. 1 illustrates the threaded shaft portion 82 being adjustably threadable through the plate portion 74 to increase or decrease the extent to which the first and second torsional spring members 50 and 51 are flexed, thereby adjusting the position at which the pivotal member 10 is supported. More particularly, advancing the threaded shaft 82 through the plate portion 74 toward the support member 20 flexes the first and second torsional springs 50 and 51, which in the exemplary embodiment raises the pivotal member 10 upwardly. Withdrawing the threaded shaft 82 from the plate portion 74 and away the support member 20 relaxes the first and second torsional springs 50 and 51, and in the exemplary embodiment lowers the pivotal member 10 downwardly. Thus the position at which the pivotal member 10 is supported by the pivotal member support 40 relative to the support member 20 is adjustable over an angular range by adjusting the adjustment member 80.

In a preferred embodiment, the pivotal support member 40, including the first and second torsional spring members 50 and 51 and the first and second transverse members 60 and 70, is formed as a unitary member from a spring steel. As discussed, the plate portion 74 is coupled to the transverse end portions 72. In embodiments without the plate portion 74, the end portions 72 may be separated, or may be formed with sufficient length to permit coupling thereof together, for example by welding, in part to increase the overall rigidity of the pivotal member support 40. In other embodiments, it may be desirable not to couple the end portions 72 together, for example where the end portions 72 are disposed into openings on corresponding opposing sides of the pivotal or support members as discussed. Forming the pivotal support member 40 as a unitary member as illustrated in FIGS. 1–4 for mounting on the outer portions of the pivotal and support members 10 and 20 provides for relatively quick and easy assembly of the pivotal support member 40 without substantial disassembly, and more particularly without removal of the pivot 30 and without separation of the pivotal and support members 10 and 20, thereby providing further advantages over the prior art.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A pivotal member support useable for supporting a pivotal member pivotally coupled to a support member by a pivot, comprising:

a first torsional spring member having a first coil portion with a first end portion and a second end portion;

a second torsional spring member having a second coil portion with a first end portion and a second end portion, the first coil portion of the first torsional spring member and the second coil portion of the second torsional spring member disposed along a common axis and arranged in generally parallel spaced apart relation;

a first transverse member coupling the first end portion of the first torsional spring member to the first end portion of the second torsional spring member;

an adjustment member protruding through the first transverse member.

2. The support of claim 1 further comprising the first transverse member arranged generally parallel to the common axis of the first and second coil portions.

3. The support of claim 1 further comprising a second transverse member coupling the second end portion of the first torsional spring member to the second end portion of the second torsional spring member.

4. The support of claim 1, wherein the adjustment member comprises a threaded shaft portion threadably disposed through the first transverse member.

5. The support of claim 1 further comprising the first end portions of the first and second torsional spring members disposed in a first common plane, and the second end portions of the first and second torsional spring members disposed in a second common plane.

6. The support of claim 5 further comprising an angle between the first common plane and the second common plane is less than 180 degrees.

7. The support of claim 1 is a unitary member formed of a spring steel.

8. The support of claim 1, wherein the first coil portion of the first torsional spring member and the second coil portion of the second torsional spring member each having at least one 360 degree coil portion.

9. A towbar support system comprising:
   a pivotal towbar pivotally coupled to a towbar support member by a pivot;
   a first torsional spring member having a first coil portion with a first end portion and a second end portion;
   a second torsional spring member having a second coil portion with a first end portion and a second end portion;
   the first coil portion of the first torsional spring member and the second coil portion of the second torsional spring member disposed about the pivot in spaced apart relation,
   the first end portions of the first and second torsional spring members are at least indirectly engageable with one of the towbar support member and the pivotal towbar, and the second end portions of the first and second torsional spring members are at least indirectly engageable with the other of the pivotal towbar and the support member,
   the pivotal towbar is supported at least through a portion of its range of pivotal motion.

10. The system of claim 9, wherein the first end portions of the first and second torsional spring members each having a generally first transverse portion engageable with one of the support member and the pivotal towbar, and the second end portions of the first and second torsional spring members each having a generally second transverse portion engageable with the other of the pivotal towbar and the support member.

11. The system of claim 9 further comprising a transverse member coupling the second end portions of the first and second torsional spring members, an adjustment member protruding through the transverse member, the adjustment member is adjustably engageable with one of the support member and pivotal towbar to bias the first and second torsional spring members.

12. The system of claim 9 further comprising:
   the pivot having a first pivot portion extending from a first side of the support member and the pivotal towbar and a second pivot portion extending from a second opposing side of the support member and the pivotal towbar,
   the first coil portion disposed about the first pivot portion, the second coil portion disposed about the second pivot portion;
   a first transverse member coupling the first end portion of the first torsional spring member to the first end portion of the second torsional spring member, the first transverse member is engageable with one of the support member and the pivotal towbar; and
   a second transverse member coupling the second end portion of the first torsional spring member to the second end portion of the second torsional spring member, the second transverse member is engageable with the other of the pivotal towbar and the support member.

13. The system of claim 12 further comprising an adjustment member protruding through one of the first and second transverse members, the adjustment member is adjustably engageable with one of the support member and the pivotal towbar to bias the first and second torsional spring members relative thereto.

14. The system of claim 12, wherein the first and second torsional spring members and the first and second transverse members comprise a unitary member formed of a spring steel.

15. The system of claim 12 further comprising the first transverse member is engageable with a bottom side of one of the towbar support member and the pivotal towbar, and the second transverse member is engageable with a bottom side of the other of the pivotal towbar and the towbar support member, whereby the pivotal towbar is supported by the first and second torsional spring members in the lowered position.

16. The system of claim 15 further comprising the first end portions of the first and second torsional spring members disposed in a first common plane, the second end portions of the first and second torsional spring members disposed in a second common plane, and an angle between the first common plane and the second common plane is less than 180 degrees.

17. In a system having a towbar pivotally coupled to a support member by about a pivot, the towbar movable between raised and lowered positions, the improvement comprising:
   a pivotal member support having a first torsional spring member disposed about a first portion of the pivot member and a second torsional spring member disposed about a second portion of the pivot member,
   first end portions of the first and second torsional spring members support one of the support member and the towbar and second end portions of the first and second torsional spring members support the other of the towbar and the support member when the towbar is in the lowered position,
   whereby the pivotal member support supports the towbar in the lowered position.

18. The improvement of claim 17 further comprising a transverse member coupling the first end portions of the first and second torsional spring members, an adjustment member protruding through the transverse member and adjustably engaged with one of the towbar and the support member when the towbar is in the lowered position.

* * * * *